Patented Jan. 22, 1929.

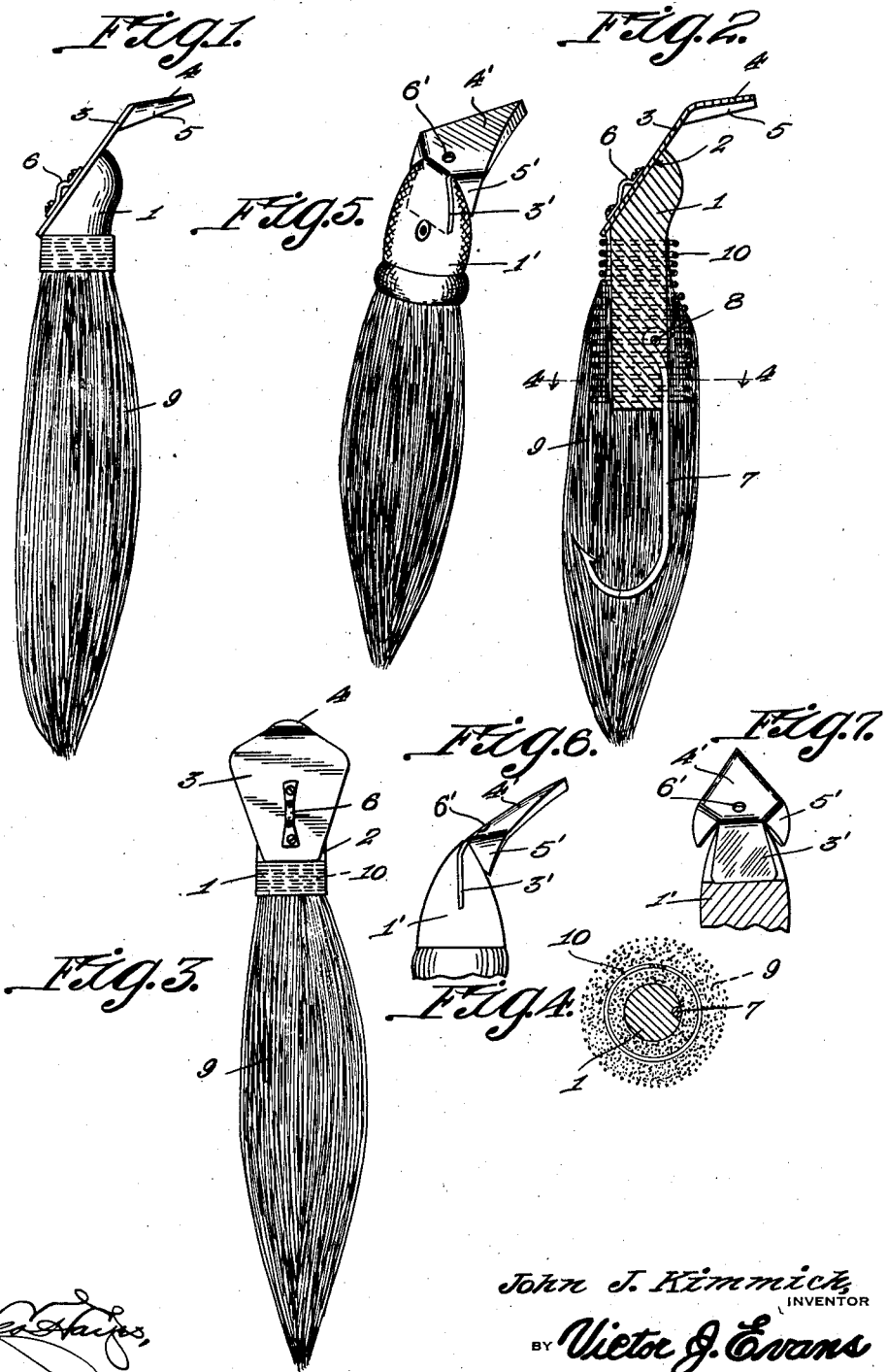

1,700,061

UNITED STATES PATENT OFFICE.

JOHN JACKSON KIMMICH, OF ELLWOOD CITY, PENNSYLVANIA.

FISH BAIT.

Application filed April 9, 1928. Serial No. 268,616.

This invention relates to a fish bait, the general object of the invention being to provide a body having a hook attached to one end thereof and an obliquely arranged plate attached to the other end, said plate having a point at its outer end which extends downwardly at an angle from the rest of the plate, with flanges at the sides of the point to give the bait side motion, the point also acting to prevent the device catching on rocks or weeds, with means for attaching feathers or bristles to the body to cover the hook.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughou the several views, and in which:—

Figure 1 is a side view of the device.

Figure 2 is a longitudinal sectional view.

Figure 3 is a view taken at right angles to Figure 1.

Figure 4 is a section on line 4—4 of Figure 2.

Figure 5 is a view showing a modification.

Figure 6 is a side view of the head part of said modification.

Figure 7 is a plan view of Figure 6, with the head in section.

In these views, the numeral 1 indicates the wooden body of the device which has one end cut at an angle to provide the oblique face 2 to which is attached a plate 3. The outer end of the plate is bent downwardly to form the point 4 and the sides of the pointed part are bent inwardly to form the wings 5. A clip 6 is fastened to the plate adjacent its inner end and the line is adapted to be fastened to this clip. The eye of the hook 7 is fastened to the under part of the body a distance from its rear end, as shown at 8, and the usual bucktail or feathers 9 covers the hook and a portion of the body, the bucktail being fastened to the body by the closely wrapped threads 10.

In the modification shown in Figures 5, 6 and 7, the front part of the body 1' is made in the shape of a head of a fish, with a part 3' of the plate held in the mouth of the fish. The point forming part 4' extends downwardly and outwardly at an angle from the body with the wings 5' so formed that they abut the under portion of the head of the fish at the sides thereof. The opening 6' for the line passes through the upper part of the part 4' adjacent its junction with the part 3'. In other respects, this form of the invention is similar to that just described.

When the device is attached to a line and drawn through the water, the nose or point 4 will depend downwardly and the wings of the point will give the device a sidewise motion so that the device will simulate a minnow swimming through the water. This point also acts to lessen the danger of the device catching on rocks or in weeds and when the point strikes a rock or other object, it will give the device a tilting movement which will act to attract fish.

In both forms of the invention, the nose or point at the front end of the plate with the wings, gives the bait a wiggling motion and in deep trolling, the extremity of the point or nose will strike stones or the like which will cause the bait to jump or move upwardly, giving the bait an extra motion which not only acts to attract fish, but also tends to prevent the bait from catching in weeds, snags and the like. Thus I have provided a bait which will not only simulate a minnow swimming through the water, but one that is properly balanced and one which will free itself of weeds, snags and the like.

As will be seen, the fish hook 7 has its point extending upwardly, which lessens the danger of the device catching in weeds or the like and the said hook is covered by the bucktail or feathers.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A fish bait comprising a body having its front end cut to provide an oblique face, a plate fastened to the said face and having a forwardly extending part, the extremity of which is bent downwardly to provide a point, with wings at its sides, means for fastening a line to the rear part of the plate, a hook connected with the rear end of the body and having its point extending upwardly and flexible material connected with the body and covering the hook.

2. A fish bait comprising a body formed of wood and having its front end cut to provide an oblique face on its upper side, a plate connected with said face and extending forwardly with its extremity bent downwardly to provide a point with wings at the sides thereof, means for fastening a line to the rear part of the front face of the plate, a fish hook connected with the under part of the body adjacent its rear end with its point extending upwardly and bucktail connected with the body and covering the hook.

3. A fish bait comprising a body, a hook fastened to the rear end of the body with its hook part extending upwardly, flexible material connected with the body and covering the hook, a plate connected with the front end of the body and having its front part extending downwardly and forwardly with converging edges forming a nose, wings on the rear of the plate at the sides thereof and means for attaching a line to the plate.

In testimony whereof I affix my signature.

JOHN JACKSON KIMMICH.